(12) United States Patent
Ageyev et al.

(10) Patent No.: US 7,895,352 B2
(45) Date of Patent: Feb. 22, 2011

(54) SYSTEM AND METHOD FOR THROTTLING HOST THROUGHPUT

(75) Inventors: Igor I. Ageyev, Tucson, AZ (US); Gary Anna, Tucson, AZ (US); Thomas W. Bish, Tucson, AZ (US); Kimberly A. Bortz, Tucson, AZ (US); Gregory T. Kishi, Oro Valley, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 12/021,873

(22) Filed: Jan. 29, 2008

(65) Prior Publication Data

US 2009/0193140 A1  Jul. 30, 2009

(51) Int. Cl.
*G06F 15/16* (2006.01)

(52) U.S. Cl. ........................... 709/233; 709/235
(58) Field of Classification Search .................. 709/233, 709/235
See application file for complete search history.

(56) References Cited

U.S. PATENT DOCUMENTS

| 7,127,568 | B2 * | 10/2006 | Watanabe et al. ........... 711/154 |
| 2003/0154272 | A1 | 8/2003 | Dillon et al. |
| 2003/0191856 | A1 | 10/2003 | Lewis et al. |
| 2004/0010585 | A1 * | 1/2004 | Jones et al. ................. 709/224 |
| 2005/0138422 | A1 | 6/2005 | Hancock et al. |
| 2006/0090163 | A1 | 4/2006 | Karisson et al. |

* cited by examiner

*Primary Examiner*—Tonia L Dollinger
*Assistant Examiner*—Adam Cooney
(74) *Attorney, Agent, or Firm*—Griffiths & Seaton PLLC

(57) ABSTRACT

A method for throttling host throughput in a computer storage subsystem is provided. The host throughput is compared to a throughput limit for a predetermined time period. If the host throughput exceeds the throughput limit during the predetermined time period, an input/output (I/O) delay is set equal to the remainder of the predetermined time period, and the delay is implemented for an associated storage device of the computer storage subsystem.

23 Claims, 4 Drawing Sheets

SYSTEM AND METHOD FOR THROTTLING HOST THROUGHPUT

BACKGROUND OF THE INVENTION

1. Field of the Invention

The present invention relates in general to computers, and more particularly to a method, system, and computer program product for throttling host throughput in computer storage subsystems.

2. Description of the Related Art

Computer systems may include a host which is connected to a computer subsystem, such as a computer storage subsystem. The host may store and access data from the computer storage subsystem over a communications channel having a maximum throughput. Generally, the throughput is measured in data passed through the channel per a certain time period, such as bytes-per-second (B/sec). Computer storage subsystems may include a variety of components such as virtual tape storage systems, where hard disk drive storage is used to emulate tape drives and tape cartridges. In other storage subsystems, hard disk drives may be configured in a redundant array of independent disks (RAID) typology.

While the communications channel between the host and the storage subsystem carries a maximum throughput, in certain situations it may be desirable to limit or "throttle" the throughput. For example, it may be desirable to throttle certain host throughput to an amount less than the maximum throughput for a certain amount of time. For example, a user may purchase a certain amount of host throughput. As a result, it is desirable to limit the host throughput to the purchased amount.

SUMMARY OF THE INVENTION

A need exists for a system, method, and computer program product for throttling host throughput in a computer storage subsystem such as a virtual tape storage system. Accordingly, in one embodiment, by way of example only, a method for throttling host throughput in a computer storage subsystem is provided. The host throughput is compared to a throughput limit for a predetermined time period. If the host throughput exceeds the throughput limit during the predetermined time period, an input/output (I/O) delay is set equal to the remainder of the predetermined time period, and the delay is implemented for an associated storage device of the computer storage subsystem.

In another embodiment, again by way of example only, a system for throttling host throughput in a computer storage subsystem is provided. A virtual server is operational on the computer storage subsystem. The virtual server is configured to compare the host throughput to a throughput limit for a predetermined time period, and if the host throughput exceeds the throughput limit during the predetermined time period, set a delay equal to the remainder of the predetermined time period, and implement the delay for an associated storage device of the computer storage subsystem.

In still another embodiment, again by way of example only, a computer program product is provided for throttling host throughput in a computer storage subsystem, the computer program product comprising a computer-readable storage medium having computer-readable program code portions stored therein. The computer-readable program code portions comprise a first executable portion for comparing the host throughput to a throughput limit for a predetermined time period, and a second executable portion for, if the host throughput exceeds the throughput limit during the predetermined time period, setting a delay equal to the remainder of the predetermined time period and implementing the delay for an associated storage device of the computer storage subsystem.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for throttling host throughput in a computer storage subsystem. These embodiments implement a timer that defines a predetermined time period in which throughput is monitored. The embodiments then monitor the throughput over a series of succeeding predetermined time periods, such as one (1) second time intervals. If an actual throughput exceeds a maximum throughput, the embodiments then set a delay equal to the remainder of an instant time period currently seen by the timer. The embodiments then institute the delay in one or more storage devices of the computer storage subsystem.

Figure 1:
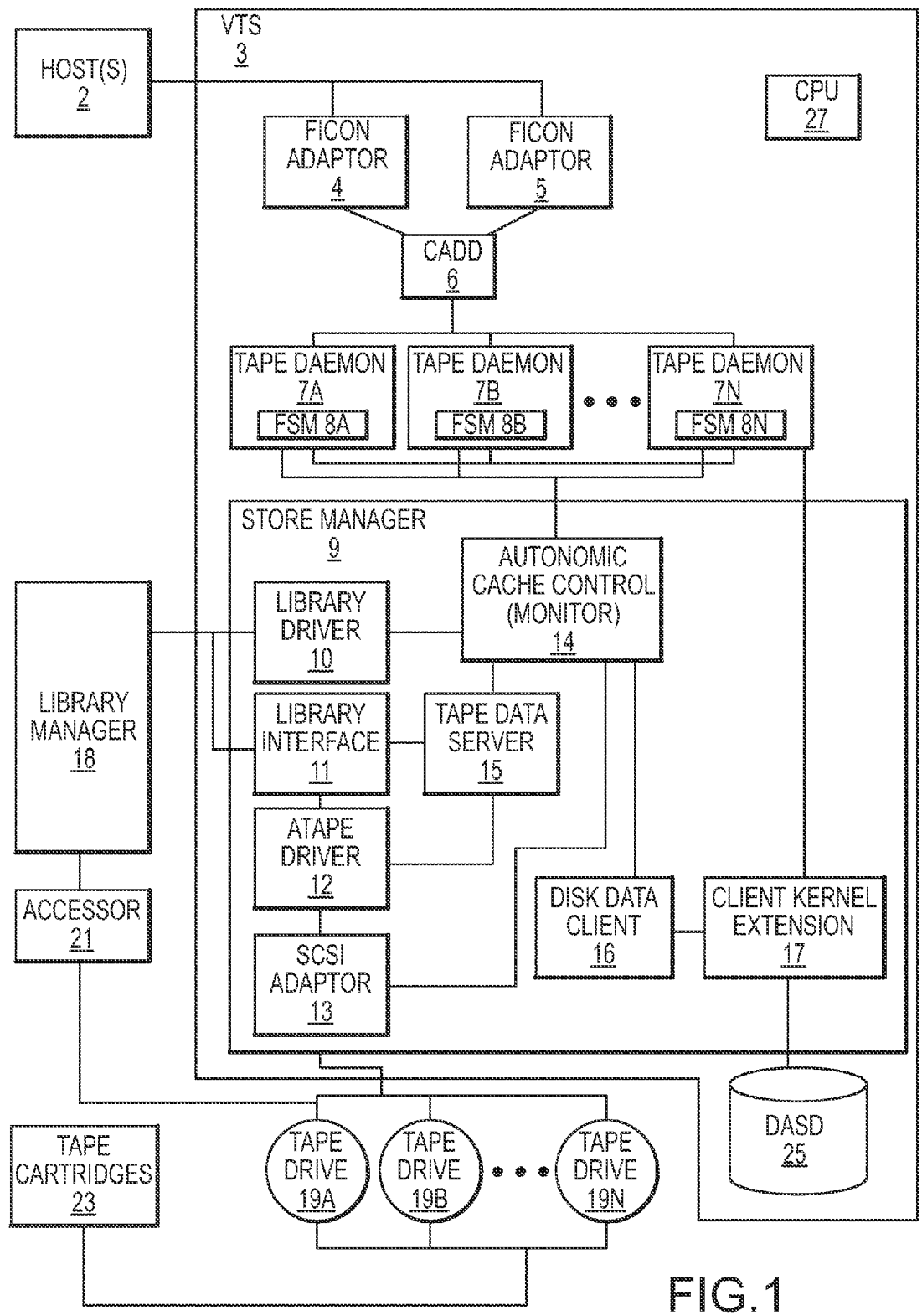
FIG. 1 is an exemplary computing environment, including a virtual tape storage system.

FIG. 1 illustrates, in a block diagram, further details of a computing environment in accordance with implementations of the invention. Hosts 2 may connect to a virtual tape server (VTS) 3 through host data interfaces, such as Fiber Connectivity (FICON) adapters 4 and 5 or any other switching mechanism known in the art (e.g., fibre channel, Storage Area Network (SAN) interconnections, etc.). The Channel Access Device Driver (CADD) 6 is a device driver for tape daemons 7A . . . 7N. Tape daemons 7A . . . 7N receive read and write tape operations from hosts 2. For a write operation, the tape daemons 7A . . . 7N receive data, create logical volumes, and write the logical volumes as files in cache, embodied as a direct access storage device (DASD) 25. For read operations, the tape daemons 7A . . . 7N access the cache 25 to retrieve data through client kernel extension 17 and return the data to hosts 2. The hosts 2 believe that they are communicating with physical tape drives, rather than with the tape daemons 7A . . . 7N, which emulate the physical tape drives. Each tape daemon 7A . . . 7N includes a file system manager (FSM) 8A . . . 8N that is used to create files in cache 25.

The storage manager 9 transfers data from cache 25 to tape drives 19A . . . 19N. In certain implementations, the storage manager 9 includes multiple components, as illustrated in FIG. 1. The autonomic cache control 14 controls the transfer of data from cache 25 to tape drives 19A . . . 19N in response to transfer operations received from hosts 2. Additionally, the autonomic cache control 14 controls the rate at which the tape daemons 7A . . . 7N write data to the cache 25. In certain implementations, the autonomic cache control 14 performs monitoring functionality.

In particular, the autonomic cache control 14 receives notification from one of the hosts 2 to transfer data. The hosts 2 indicate which logical volumes (not shown) are to be placed into particular pools of tape cartridges 23. The autonomic cache control 14 maintains metadata on which files are stored in cache 25. The autonomic cache control 14 notifies the disk data client 16 to transfer data. The disk data client 16 requests data from the client kernel extension 17, which retrieves the requested data from cache 25 and forwards the data to disk data client 16. The disk data client 16 forwards the data to tape data server 15 at the request of the autonomic cache control 14.

The tape data server controls the writing of data to tape drives 19A . . . 19N. The data is sent from tape data server 15 to A tape driver 12 to SCSI adaptor 13 and to the tape drives 19A . . . 19N. The tape data server 15 uses a library interface 111 to tell the library manager 18 which tape cartridge 23 is to be put into one of the tape drives 19A . . . 19N. The autonomic cache control 14 sends messages to the library manager 18 through the library driver 10

The library manager 18 manages the mounting and unmounting of the tape cartridges 23 from the tape drives 19A . . . 19N. When the library manager 18 receives a notification to mount or unmount a tape cartridge 23, the library manager 18 notifies the accessor 21, which is used to access the tape drives 19A . . . 19N. The accessor 21 mounts and unmounts tape drives 19A . . . 19N.

Virtual tape servers 3 as well as adapters 4 and 5 may utilize hardware, software, firmware, or a combination thereof to perform various method steps as will be further described. For example, device drivers such as the CADD 6 may be configured to be operational on the virtual tape servers 3. In one embodiment, the CADD 6 may be integrated into a kernel operational on the virtual tape server 3. In addition, the virtual tape server 3 and/or adapters 4 and 5 may utilize a shared memory location in CADD 6 to access various data as will be further described. While the depicted embodiment illustrates virtual tape servers 3 integrated into a particular computing environment, one skilled in the art will appreciate that the methods and systems further described and claimed may be applied to various computer system components in a variety of configurations and compliant with various protocols.

As previously described, a timer may be implemented that defines a predetermined time period, such as one second. As the storage subsystem is operational, the timer turns over or "pops" at the conclusion of one time period and the beginning of a succeeding time period. The timer may be established in CADD. The timer may be used to set a throughput limit for the time period for a value set by a user. The throughput limit is obtained at the beginning of each time period to account for dynamic changes made to the throughput limit by the user. For example, if a customer/user decides to purchase additional throughput, a feature code may be applied while the customer is still in production (i.e., while the customer is still using the storage subsystem for an action). CADD may update this throughput limit during a succeeding time period.

In one embodiment, a global variable may be defined to represent an actual throughput seen during a particular time period. The timer may reset this variable's value depending on if the actual throughput is less than or greater than the throughput limit. If the total throughput value is found to be less than or equal to the max throughput limit, the actual throughput value for the upcoming one second period is reset to zero. However, if the actual throughput is found to be greater than the max limit throughput value, then the actual throughput for the upcoming one second period is set to the difference between the actual throughput value and the limit throughput value.

The timer may also be configured to set a period timer. The period timer may be set to start at the beginning of a predetermined time period. The period timer may then be stopped if and when the throughput limit is reached. The value of the period timer may then be used to determine a delay to be applied to I/O devices associated with the computer storage system to stop additional throughput during a respective time period. Such a delay will be further described.

Since CADD may execute in a multi-threaded environment, it is possible that the delay to stop incoming throughput may not be communicated to all devices before the next throughput requests have come through. By applying the previous period's throughput overage to the next period's actual throughput value, the code is able to account for the throughput overage and effectively manage throughput from the host.

Figure 2:
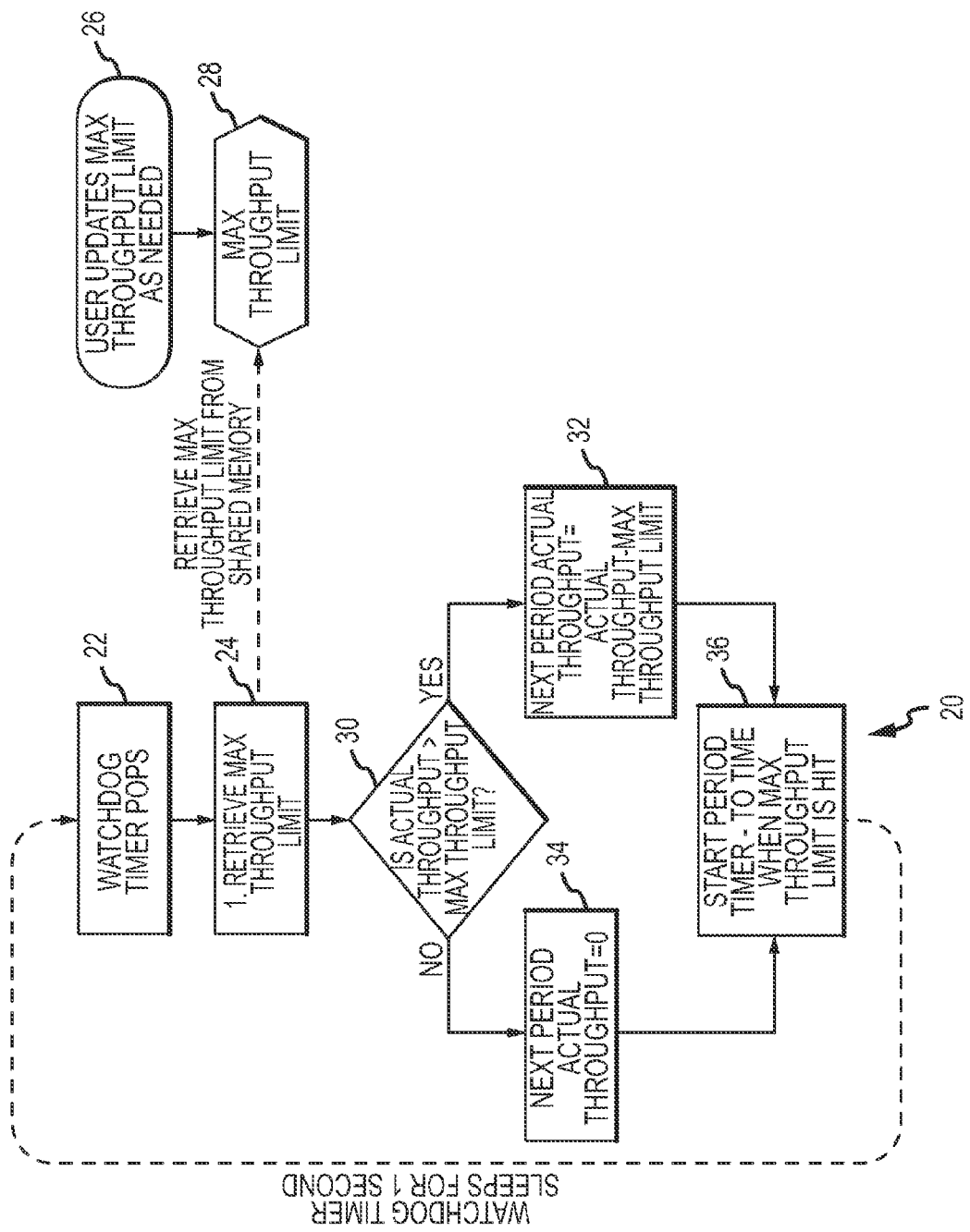
FIG. 2 is a flow chart diagram of an exemplary method for implementing a throughput timer as part of an overall method for throttling host throughput in a computer storage subsystem.

FIG. 2 is a flow chart depicting an exemplary method 20 of operation for a timer as previously described. Method 20 begins as the timer pops (step 22) indicating the conclusion of a first time period and the beginning of a second, succeeding time period. In the present depiction, the time period is set to one (1) second in length. Method 20 then retrieves a throughput limit from a shared memory location (step 24). This throughput limit may be set by a user and updated as needed (steps 26, 28). Updating the throughput limit may occur dynamically as previously described during the succeeding time period.

Once the throughput limit for the instant time period is retrieved from shared memory, method 30 then queries whether an actual throughput (measured from the communications channel) exceeds the throughput limit (decision 30). The actual throughput may be measured by totaling the byte count of all records passed through the communications channel during the instant time period. For example, using the depicted embodiment of FIG. 1, as throughput is processed during the one second period, the host adapter may send records to CADD that contain the length of the data in bytes. The bytes are added to the actual throughput value in order to keep track of how much throughput is to be processed. The value of actual throughput value is then compared to the value of the max throughput limit value. If actual throughput value is greater than or equal to max throughput limit value, the code stops the period timer as will be described below.

If the actual throughput exceeds the throughput limit, then the actual throughput for the upcoming one second period is set to the difference between the actual throughput value and the limit throughput value (step 32) as previously described. If however, the total throughput value is found to be less than or equal to the max throughput limit, the actual throughput value for the upcoming one second period is reset to zero (step 34) as previously described. In either case, at the beginning of the time period, the period timer runs up to if and when the throughput limit is exceeded (step 36). If the throughput limit is not exceeded, then the value of the period timer equals the predetermined time period, and starts over again at the beginning of the succeeding time period. As the remainder of the predetermined time period (in this case, one second) passes, the timer sleeps and ultimately returns to step 22 when the timer pops again.

The difference of the period timer's value at the end of the predetermined time period compared to the value of the beginning of the predetermined time period represents how much time has elapsed before the throughput limit had been reached. This difference is subtracted from one second (in the exemplary embodiment) and the result represents the amount of time to delay the devices. The result represents the portion of the predetermined time period remaining when the throughput limit is exceeded. The amount of delay, in nanoseconds, is stored. As long as the value of the delay is greater than zero, notification of the delay will be passed on in the CADD's response to the host adapter, as incoming messages from the devices are received in CADD.

Figure 3:
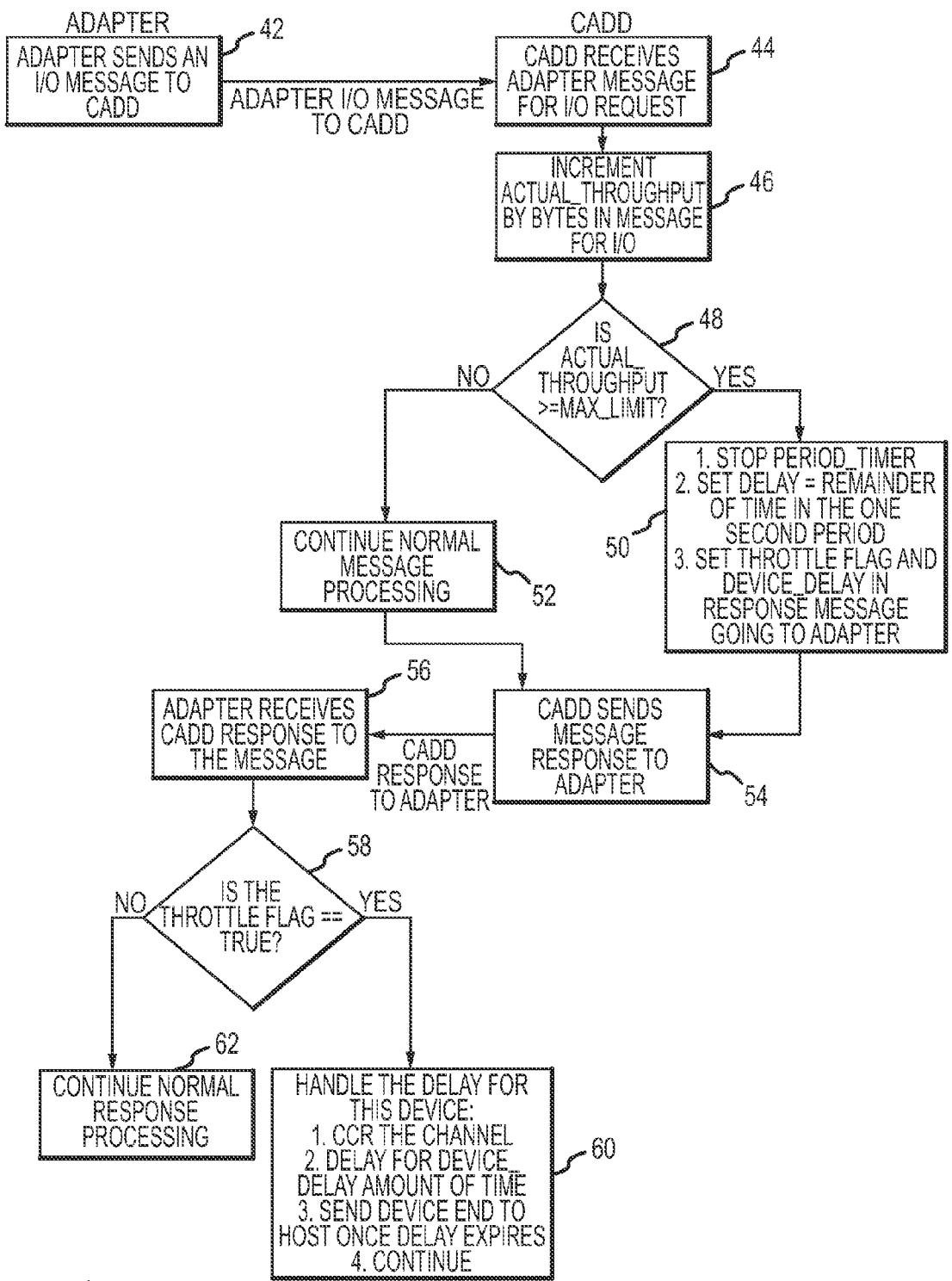
FIG. 3 is a flow chart diagram of an exemplary method for monitoring host throughput and setting a delay as part of an overall method for throttling host throughput in a computer storage subsystem.
Figure 4:
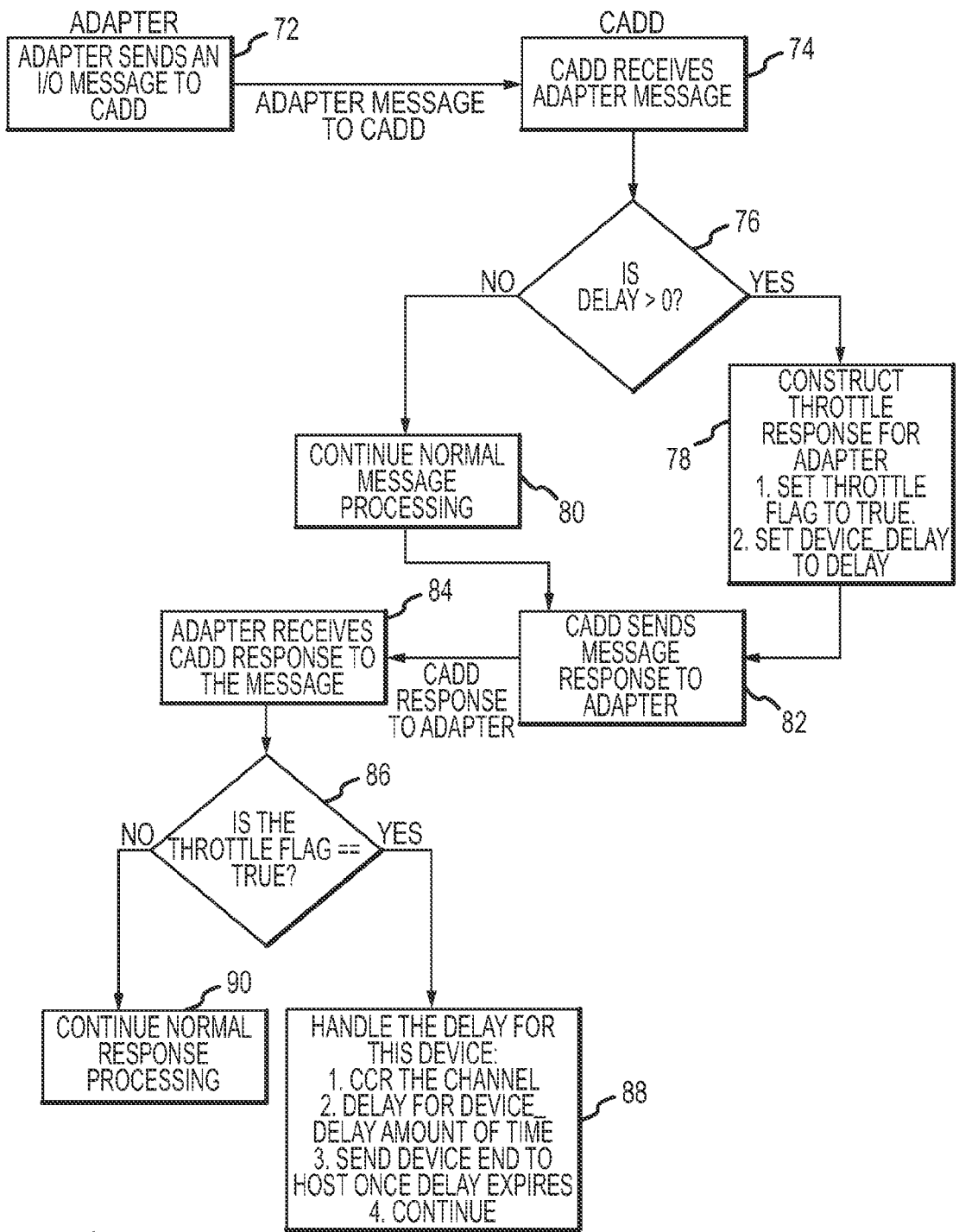
FIG. 4 is a flow chart diagram of an exemplary method for alerting a storage device to be throttled as part of an overall method for throttling host throughput in a computer storage subsystem.

FIGS. 3 and 4, following, are flow chart diagrams of exemplary methods of operation of various aspects of the storage subsystem depicted in FIG. 1 as part of an overall system, method and computer program product for throttling host throughput. The functionality of host adapters 4 and 5 (FIG. 1) are designated as shown. The functionality of virtual tape server 3 incorporating CADD 6 (again FIG. 1) is designated. However, one skilled in the art will appreciate that various other computer and storage components may be utilized to implement aspects of the depicted methods.

In light of the foregoing, FIG. 3 is a flow chart diagram of an exemplary method 40 of operation for monitoring throughput and setting a delay. As a first step in method 40, the adapter device sends an I/O message to CADD (step 42). The I/O message may be a read or a write I/O instruction, for example. The CADD receives the adapter device message (step 44). The actual throughput value is measured by examining the records sent over the channel and is denoted as ACTUAL_THROUGHPUT (step 46). The actual throughput value is compared to a throughput limit value denoted as MAX_LIMIT (decision 48). If the actual throughput value exceeds the throughput limit, the period timer is stopped, the DELAY value is set to the remainder of the instant predetermined time period, a THROTTLE flag is set to true and a DEVICE_DELAY value is set to the calculated DELAY value (step 50). Such a flag will be further described. If the actual throughput value does not exceed the throughput limit, the system continues normal message processing (step 52). In either case, the message response (including the THROTTLE flag setting and DEVICE_DELAY value) is sent to the adapter (step 54).

The adapter receives the CADD response (step 56) including the THROTTLE flag setting and DEVICE_DELAY values. The adapter then queries if the THROTTLE flag is set (decision 58). If so, the adapter handles the delay. The adapter institutes a command channel retry (CCR) for the channel which will be further described. The adapter delays all I/O of the associated storage device for the DELAY_DEVICE amount of time. Finally, the adapter is configured to send a Device End message to the host once the delay expires. The adapter then continues response processing (step 60). If the THROTTLE flag is not set (again decision 58), the system continues normal response processing (step 62).

In order to notify the adapter that a delay is in effect, the CADD code must set flags to indicate no further throughput is allowed in the response messages to the adapter. Additionally, CADD must also communicate to the adapter the amount of time to delay in this response. CADD may be configured to send the delay flag and time in the response to the adapter by checking the delay in effect flag while processing the device request. When the delay is in effect, CADD may be configured to respond to the adapter immediately without processing throughput.

When an adapter receives a response from CADD, it will check if the delay flag (e.g., THROTTLE flag) is set for the associated storage device. If the delay is in effect, the adapter will delay any further activity on the device for the time specified in the response message from CADD. The adapter sends the CCR command to the channel and after the delay is complete, the adapter will send device end status to the host. The above process has the effect of holding off any further throughput until the beginning of the succeeding time period.

In light of the foregoing, FIG. 4 is a flow chart diagram of an exemplary method 70 to institute a delay. Again, various steps associated with the adapter and CADD is indicated. Method 70 begins by the adapter sending an I/O message to CADD (step 72). CADD receives the message (step 74). CADD queries whether the calculated DELAY value is greater than zero (0) (decision 76). If this is the case, the CADD constructs a throttle response for the adapter by setting the THROTTLE flag to true and setting the DEVICE_DELAY value to the calculated DELAY value (step 78). If DELAY is not greater than zero, the system continues normal message processing (step 80). The CADD then sends the message response to the adapter (including the THROTTLE flag and DEVICE_DELAY value) (step 82).

Once the response is received by the adapter (step 84), the adapter queries if the THROTTLE flag is set to true (decision 86). If yes, the adapter handles the delay for the associated storage device, CCRs the channel, delays all I/O of the associated storage device for the DEVICE_DELAY amount of time, and sends a Device End to the host once the delay expires. The adapter continues message processing (step 88). If the THROTTLE flag is not set to true (again, decision 86), the adapter continues normal response processing (step 90).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for throttling host throughput in a computer storage subsystem, comprising:
   for each of a plurality of time intervals, comparing the host throughput to a throughput limit, wherein if the host throughput exceeds the throughput limit during one of the plurality of time intervals:
      measuring a remainder period equal to a difference between a first time corresponding to when the host throughput exceeded the throughput limit and a second time corresponding to an end of the one of the plurality of time intervals,
      setting an input/output (I/O) delay equal to the remainder period, and
      applying the I/O delay to a succeeding one of the plurality of time intervals for an associated storage device of the computer storage subsystem while re-comparing the host throughput to the throughput limit during the succeeding one of the plurality of time intervals.

2. The method of claim 1, further including establishing a timer for measuring the remainder period.

3. The method of claim 1, further including obtaining the throughput limit at the beginning of each of the plurality of time intervals.

4. The method of claim 3, further including defining a global variable representing an actual throughput.

5. The method of claim 4, further including, if the host throughput exceeds the throughput limit, setting the global variable to represent the remainder period.

6. The method of claim 5, further including, if the host throughput does not exceed the throughput limit, setting the global variable representing the actual throughput to zero.

7. The method of claim 1, wherein setting the I/O delay includes storing the I/O delay.

8. The method of claim 1, wherein applying the I/O delay to the succeeding one of the plurality of time intervals for the associated storage device of the computer storage subsystem includes sending a response to a host adapter of the associated storage device including the I/O delay.

9. The method of claim 8, wherein applying the I/O delay to the succeeding one of the plurality of time intervals for the associated storage device of the computer storage subsystem includes executing a channel command retry command for a communications channel of the associated storage device.

10. A system for throttling host throughput in a computer storage subsystem, comprising:
a hardware processor;
a virtual server operational on the computer storage subsystem, the virtual server configured to:
for each of a plurality of time intervals, compare the host throughput to a throughput limit, wherein if the host throughput exceeds the throughput limit during one of the plurality of time intervals;
measure a remainder period equal to the difference between a first time corresponding to when the host throughput exceeded the throughput limit and a second time corresponding to an end of the one of a plurality of time intervals,
set an input/output (I/O) delay equal to the remainder period, and
apply the I/O delay to a succeeding one of the plurality of time intervals for an associated storage device of the computer storage subsystem while re-comparing the host throughput to the throughput limit during the succeeding one of the plurality of time intervals.

11. The system of claim 10, wherein the virtual server is further configured to establish a timer for measuring the remainder period.

12. The system of claim 10, wherein the virtual server is further configured to obtain the throughput limit at the beginning of the each of the plurality of time intervals.

13. The system of claim 10, wherein the virtual server is further configured to define a global variable representing an actual throughput.

14. The system of claim 13, wherein the virtual server is further configured to, if the host throughput exceeds the throughput limit, set the global variable to represent the remainder period so as to penalize host throughput of the succeeding one of the plurality of time periods for the host throughput exceeding the throughput limit.

15. The system of claim 14, wherein the virtual server is further configured to, further including, if the host throughput does not exceed the throughput limit, set the global variable representing the actual throughput to zero.

16. The system of claim 10, wherein the virtual server includes a channel adapter device driver (CADD) for setting the I/O delay.

17. The system of claim 10, further including a host adapter coupled to the virtual server and the associated storage device, the host adapter receiving a delay message from the virtual server and implementing the I/O delay for the associated storage device.

18. A computer program product for throttling host throughput in a computer storage subsystem, the computer program product comprising a non-transitory computer-readable storage medium having computer-readable program code portions stored therein, the computer-readable program code portions comprising:
a first executable portion for, for each of a plurality of time intervals, comparing the host throughput to a throughput limit, wherein if the host throughput exceeds the throughput limit during one of the plurality of time intervals:
a remainder period, equal to a difference between a first time corresponding to when the host throughput exceeded the throughput limit and a second time corresponding to an end of the one of the plurality of time intervals, is measured and
a second executable portion for, if the host throughput exceeds the throughput limit during the one of the plurality of time intervals, setting an input/output (I/O) delay equal to the remainder period and applying the I/O delay to a succeeding one of the plurality of time intervals for an associated storage device of the computer storage subsystem while re-comparing the host throughput to the throughput limit during the succeeding one of the plurality of time intervals.

19. The computer program product of claim 18, further including a third executable portion for establishing a timer for measuring the remainder period.

20. The computer program product of claim 18, further including a third executable portion for obtaining the throughput limit at the beginning of each of the plurality of time intervals.

21. The computer program product of claim 18, further including a third executable portion for defining a global variable representing an actual throughput.

22. The computer program product of claim 21, further including a fourth executable portion for, if the host throughput exceeds the throughput limit, setting the global variable to represent the actual throughput.

23. The computer program product of claim 22, further including a fifth executable portion for, if the host throughput does not exceed the throughput limit, setting the global variable representing the actual throughput to zero.

* * * * *